United States Patent
Lee et al.

(10) Patent No.: US 8,838,456 B2
(45) Date of Patent: Sep. 16, 2014

(54) IMAGE PROCESSING APPARATUS AND CONTROL METHOD THEREOF AND IMAGE PROCESSING SYSTEM

(71) Applicant: Samsung Electronics Co., Ltd., Suwon-si (KR)

(72) Inventors: Joo-yeong Lee, Yongin-si (KR); Sang-shin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/894,130

(22) Filed: May 14, 2013

(65) Prior Publication Data

US 2014/0095175 A1    Apr. 3, 2014

Related U.S. Application Data

(63) Continuation of application No. 13/745,233, filed on Jan. 18, 2013.

(30) Foreign Application Priority Data

Sep. 28, 2012  (KR) ........................ 10-2012-0109454
Oct. 18, 2012  (KR) ........................ 10-2012-0115783

(51) Int. Cl.
*G10L 21/00*  (2013.01)
*G10L 15/22*  (2006.01)
(Continued)

(52) U.S. Cl.
CPC ............ *G06F 3/167* (2013.01); *G10L 2015/088* (2013.01); *G10L 15/22* (2013.01); *G10L 15/30* (2013.01); *H04H 60/58* (2013.01); *G10L 15/26* (2013.01); *G10L 2015/223* (2013.01)
USPC ............ 704/270.1; 704/271; 704/9; 704/251; 704/257; 455/563; 379/88.04; 379/202.01

(58) Field of Classification Search
USPC .................. 704/270.1, 270, 271, 9, 251, 257; 455/563; 379/52, 88.04, 88.03, 88.01, 379/202.01; 709/204, 219; 715/203; 700/264, 245, 225, 258; 340/7.54; 348/14.01; 708/109
See application file for complete search history.

(56) References Cited

U.S. PATENT DOCUMENTS 6,314,398 B1    11/2001  Junqua et al.
6,757,718 B1 *   6/2004  Halverson et al. ............ 709/218

(Continued)

FOREIGN PATENT DOCUMENTS

DE          60012065 T2    11/2004
JP          09-186943 A    7/1997

(Continued)

OTHER PUBLICATIONS

Communication from the European Patent Office issued Jul. 5, 2013 in counterpart European Application No. 13151937.3.

(Continued)

*Primary Examiner* — Vijay B Chawan
(74) *Attorney, Agent, or Firm* — Sughrue Mion, PLLC

(57) ABSTRACT

An image processing apparatus including: image processor which processes broadcasting signal, to display image based on processed broadcasting signal; communication unit which is connected to a server; a voice input unit which receives a user's speech; a voice processor which processes a performance of a preset corresponding operation according to a voice command corresponding to the speech; and a controller which processes the voice command corresponding to the speech through one of the voice processor and the server if the speech is input through the voice input unit. If the voice command includes a keyword relating to a call sign of a broadcasting channel, the controller controls one of the voice processor and the server to select a recommended call sign corresponding to the keyword according to a predetermined selection condition, and performs a corresponding operation under the voice command with respect to the broadcasting channel of the recommended call sign.

20 Claims, 10 Drawing Sheets

(51) Int. Cl.
  G06F 3/16 (2006.01)
  H04H 60/58 (2008.01)
  G10L 15/26 (2006.01)
  *G10L 15/08* (2006.01)
  *G10L 15/30* (2013.01)

(56) References Cited

U.S. PATENT DOCUMENTS

| | | | |
|---|---|---|---|
| 7,096,486 | B1 | 8/2006 | Ukai et al. |
| 8,069,041 | B2 | 11/2011 | Kuboyama et al. |
| 8,223,961 | B2 | 7/2012 | Chew |
| 8,421,932 | B2 | 4/2013 | Ouchi et al. |
| 8,533,761 | B1* | 9/2013 | Sahami et al. .................. 725/53 |
| 2003/0004966 | A1* | 1/2003 | Bolle et al. ................. 707/104.1 |
| 2003/0033347 | A1* | 2/2003 | Bolle et al. ..................... 709/107 |
| 2006/0004743 | A1 | 1/2006 | Murao et al. |
| 2007/0118382 | A1 | 5/2007 | Kuboyama et al. |
| 2008/0270449 | A1* | 10/2008 | Gossweiler et al. .......... 707/102 |
| 2009/0023406 | A1* | 1/2009 | Ellis et al. ..................... 455/140 |
| 2009/0030681 | A1 | 1/2009 | Sureka et al. |
| 2012/0162540 | A1* | 6/2012 | Ouchi et al. .................. 348/734 |
| 2012/0215537 | A1 | 8/2012 | Igarashi |

FOREIGN PATENT DOCUMENTS

| | | |
|---|---|---|
| JP | 11-239067 A | 8/1999 |
| JP | 2002-118478 A | 4/2002 |
| JP | 2002-162987 A | 6/2002 |
| JP | 3523213 B2 | 2/2004 |
| JP | 2005-242183 A | 9/2005 |
| JP | 2005-249829 A | 9/2005 |
| JP | 2006-227135 A | 8/2006 |
| JP | 2007-142840 A | 6/2007 |
| JP | 2009-280048 A | 12/2009 |
| JP | 2012-133243 A | 7/2012 |
| KR | 10-2012-0010818 A | 2/2012 |

OTHER PUBLICATIONS

Communication from the European Patent Office issued Jul. 25, 2013 in counterpart European Application No. 13151937.3.
Communication from the Japanese Patent Office dated Aug. 13, 2013, in a counterpart Japanese application No. 2013-010622.
Communication dated Aug. 30, 2013 from the Korean Intellectual Property Office in a counterpart application No. 10-2012-0115783.
Communication dated Mar. 29, 2013 issued by the Korean Intellectual Property Office in counterpart Korean Patent Application No. 10-2012-0115783.
Communication dated Apr. 16, 2013 issued by the Japanese Patent Office in counterpart Japanese Patent Application No. 2013-010622.
International Search Report dated May 13, 2013 issued by the International Searching Authority in counterpart International Application No. PCT/KR2013/000440 (PCT/ISA/210).
Search Report dated Sep. 5, 2013, issued by the German Patent Office in counterpart German Application No. 20 2013 100 036.1.
Communication dated Oct. 30, 2013, issued by the Australian Patent Office in counterpart Australian Application No. 2013200307.
Communication dated Dec. 17, 2013 by the Japanese Patent Office in counterpart Japanese Patent Application No. 2013-010622.

* cited by examiner

IMAGE PROCESSING APPARATUS AND CONTROL METHOD THEREOF AND IMAGE PROCESSING SYSTEM

CROSS-REFERENCE TO RELATED APPLICATION

This application is a Continuation of U.S. application Ser. No. 13/745,233, filed Jan. 18, 2013, which claims priority from Korean Patent Application No. 10-2012-0109454, filed on 28 Sep. 2012, and 10-2012-0115783, filed on Oct. 18, 2012 in the Korean Intellectual Property Office, the disclosure of which is incorporated herein by reference.

BACKGROUND

1. Field

Apparatuses and methods consistent with the exemplary embodiments relate to an image processing apparatus and a control method thereof and an image processing system which processes an image signal such as a broadcasting signal supplied from the outside to display an image based on the processed image signal, and more particularly, to an image processing apparatus and a control method thereof and an image processing system which recognizes a user's voice command to perform a function or operation.

2. Description of the Related Art

An image processing apparatus processes image signals and/or image data supplied from the outside, according to various image processing operations. The image processing apparatus may display an image on its display panel based on the processed image signal or output the processed image signal to another display apparatus having a panel to display an image thereon based on the processed image signal. That is, as long as the image processing apparatus may process the image signal, it may include or not include a panel to display an image. The former case may be implemented as a TV and the latter case may be implemented as a set-top box.

The image processing apparatus is continuously added with functions to extend its functions in line with the development of technology. In such a trend, various configurations and methods are provided to input user's commands as desired to the image processing apparatus. For example, in a conventional image processing apparatus, if a user presses a key/button from a remote controller, a control signal is transmitted to the image processing apparatus to perform an operation as desired by a user. In recent years, however, the image processing apparatus detects a user's motion or speech, analyzes the detected content, and performs a corresponding operation, i.e., the image processing apparatus is controlled according to the intent of the user.

SUMMARY

Accordingly, one or more exemplary embodiments provide an electronic device, a server and a control method thereof which minimizes the time for recognizing a user's command and performing an operation.

The foregoing and/or other aspects may be achieved by providing an image processing apparatus including: an image processor which processes a broadcasting signal transmitted from the outside, to display an image based on the processed broadcasting signal; a communication unit which is connected to a server for communication; a voice input unit which receives a user's speech; a voice processor which processes a performance of a preset corresponding operation according to a voice command corresponding to the speech; and a controller which processes the voice command corresponding to the speech through one of the voice processor and the server if the speech is input through the voice input unit, wherein if the voice command includes a keyword relating to a call sign of a broadcasting channel, the controller controls one of the voice processor and the server to select a recommended call sign corresponding to the keyword according to a predetermined selection condition, and performs a corresponding operation under the voice command with respect to the broadcasting channel of the recommended call sign.

A database of at least one call sign candidate corresponding to the keyword may be stored in the image processing apparatus and the server, and the recommended call sign may be selected from a plurality of call sign candidates searched from the database under the selection condition.

The selection condition may include selection of a call sign candidate, as the recommended call sign, whose selection frequency is a preset ranking or more among the plurality of call sign candidates, based on usage history information of the image processing apparatus.

The selection condition may include selection of a call sign candidate, as the recommended call sign, whose selection frequency is a preset ranking or more within a plurality of other image processing apparatuses communicating with the server among the plurality of call sign candidates.

The recommended call sign may be one or more selected from the plurality of call sign candidates, and the controller may display a user interface (UI) which is provided to select one of a plurality of selected call sign candidates if the plurality of call sign candidates is selected.

If an input of selecting one of the call sign candidates is not performed for preset time after the UI is displayed, the controller may select one of the recommended call signs under the preset selection condition.

The communication unit may communicate with a speech-to-text (STT) server which converts the speech into a voice command of a text, and upon input of the speech to the voice input unit, the controller may transmit a voice signal of the speech to the STT server, and may receive the voice command corresponding to the speech from the STT server.

If the voice command may be a short sentence, the controller may control the voice processor to process the voice command, and if the voice command is a conversational sentence, the controller may control the server to process the voice command.

The image processing apparatus may further including a display which displays an image thereon based on a broadcasting signal processed by the image processor.

Another aspect of the present exemplary embodiment may be achieved by providing a control method of an image processing apparatus which communicates with a server including: receiving a user's speech; and processing a voice command corresponding to the speech through one of the image processing apparatus and the server, and performing a preset corresponding operation under the voice command, wherein the performing the preset corresponding operation under the voice command includes controlling to select a recommended call sign corresponding to a keyword by one of the image processing apparatus and the server under preset selection condition if the voice command includes a keyword relating to a call sign of a broadcasting channel; and performing a corresponding operation under the voice command with respect to a broadcasting channel of the recommended call sign.

A database of at least one call sign candidate corresponding to the keyword may be stored in the image processing apparatus and the server, and the recommended call sign may be selected from a plurality of call sign candidates searched from the database, under the selection condition.

The selection condition may include selection of a call sign candidate, as the recommended call sign, whose selection frequency is a preset ranking or more among the plurality of call sign candidates, based on usage history information of the image processing apparatus.

The selection condition may include selection of a call sign candidate, as the recommended call sign, whose selection frequency is a preset ranking or more within a plurality of other image processing apparatuses communicating with the server among the plurality of call sign candidates.

The recommended call sign may be one or more selected from the plurality of call sign candidates, and the performing a corresponding operation may include displaying a user interface (UI) which is provided to select one of a plurality of selected call sign candidates if the plurality of call sign candidates is selected.

The displaying the UI may include selecting one of the recommended call signs under the preset selection condition if an input of selecting one of the call sign candidates is not performed for preset time after the UI is displayed.

The image processing apparatus may communicate with an STT server which converts the speech into a voice command of a text, and the receiving the user's speech may include transmitting a voice signal of the speech to the STT server, and receiving the voice command corresponding to the speech from the STT server.

The performing the preset corresponding operation under the voice command may include processing the voice command through the image processing apparatus if the voice command is a short sentence, and processing the voice command through the server if the voice command is a conversational sentence.

Another aspect of the present exemplary embodiment may be achieved by providing an image processing system including: an image processing apparatus which processes a broadcasting signal transmitted from the outside, to display an image based on the processed broadcasting signal; a server which communicates with the image processing apparatus, wherein the image processing apparatus includes a voice input unit which receives a user's speech, a voice processor which performs a preset corresponding operation under a voice command corresponding to the speech; a controller which controls one of the voice processor and the server to process the voice command corresponding to the speech, if the speech is input, wherein the controller controls one of the voice processor and the server to select a recommended call sign corresponding to a keyword under preset selection condition if the voice command includes the keyword relating to a call sign of a broadcasting channel, and performs a corresponding operation under the voice command with respect to a broadcasting channel of the recommended call sign.

The image processing system may further including an STT server which converts the speech into a voice command of a text, wherein if the speech is input to the voice input unit, the controller may transmit a voice signal of the speech to the STT server, and receives the voice command corresponding to the speech from the STT server.

In one exemplary embodiment, there is an image processing apparatus including: an image processor which processes a broadcasting signal received from an outside, to display an image based on the processed broadcasting signal; a communicator which is operable to communicate with a server; a voice receiver which receives a user's speech; a voice processor which is operable to process a performance of an operation according to a voice command corresponding to the user's speech; and a controller which processes the voice command corresponding to the user's speech through one of the voice processor and the server if the speech is received through the voice receiver, wherein if the voice command includes a keyword relating to a desired call sign of a broadcasting channel, the controller controls one of the voice processor and the server to select a call sign corresponding to the keyword according to a predetermined selection condition, as a recommended call sign, and performs the operation according to the voice command with respect to the broadcasting channel of the recommended call sign.

In yet another exemplary embodiment, there is a control method of an image processing apparatus which communicates with a server, the method including: receiving a user's speech; and processing a voice command corresponding to the user's speech through one of the image processing apparatus and the server, and performing an operation according to the voice command, wherein the performing the operation according to the voice command includes: controlling to select a call sign corresponding to a keyword, as a recommended call sign, by one of the image processing apparatus and the server under a preset selection condition if the voice command includes a keyword relating to a call sign of a broadcasting channel; and performing an operation according to the voice command with respect to a broadcasting channel of the recommended call sign.

In yet another exemplary embodiment, there is an image processing system including: an image processing apparatus which processes a broadcasting signal received from an outside, to display an image based on the processed broadcasting signal; a server which communicates with the image processing apparatus, wherein the image processing apparatus includes a voice receiver which is operable to receive a user's speech, a voice processor which performs a preset corresponding operation for a voice command corresponding to the user's speech; and a controller which controls one of the voice processor and the server to process the voice command corresponding to the user's speech, if the user's speech is received, wherein the controller controls one of the voice processor and the server to select a call sign corresponding to a keyword, as a recommended call sign, under preset selection condition if the voice command includes the keyword relating to a call sign of a broadcasting channel, and performs a corresponding operation under the voice command with respect to a broadcasting channel of the recommended call sign.

In one exemplary embodiment, there is a voice command recognition method including: receiving a user voice command through a microphone of a display device, to switch from a displayed broadcast channel to another broadcast channel, the user voice command including a identifier (ID) of the other broadcast channel; digitizing the user voice command and processing the digitized user voice command; comparing the processed user voice command with pre-stored digital models of IDs of a plurality of broadcast channels and determining one of the pre-stored digital models of IDs of the plurality of broadcast channels as being a match, the comparing operation being performed at at least one of the display device or an external server that is separate from the display device; and switching from the displayed broadcast channel to a broadcast channel corresponding to the determined one of pre-stored digital models of IDs of the plurality of broadcast channels being the match.

The ID may be one from among a numeric ID, aphabetic ID, and an alphanumeric ID.

The determining one of the pre-stored digital models of IDs of the plurality of broadcast channels as being the match includes determining a plurality of the pre-stored digital models of IDs of the plurality of broadcast channels as being matches, the method further including: displaying the IDs corresponding to the determined plurality of the pre-stored digital models of IDs of the plurality of broadcast channels being the matches.

The voice command recognition method further includes: automatically selecting one of the displayed IDs if a user input to select one of the displayed IDs is not received, the selected one of the displayed IDs having been previously selected the most among the displayed IDs.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
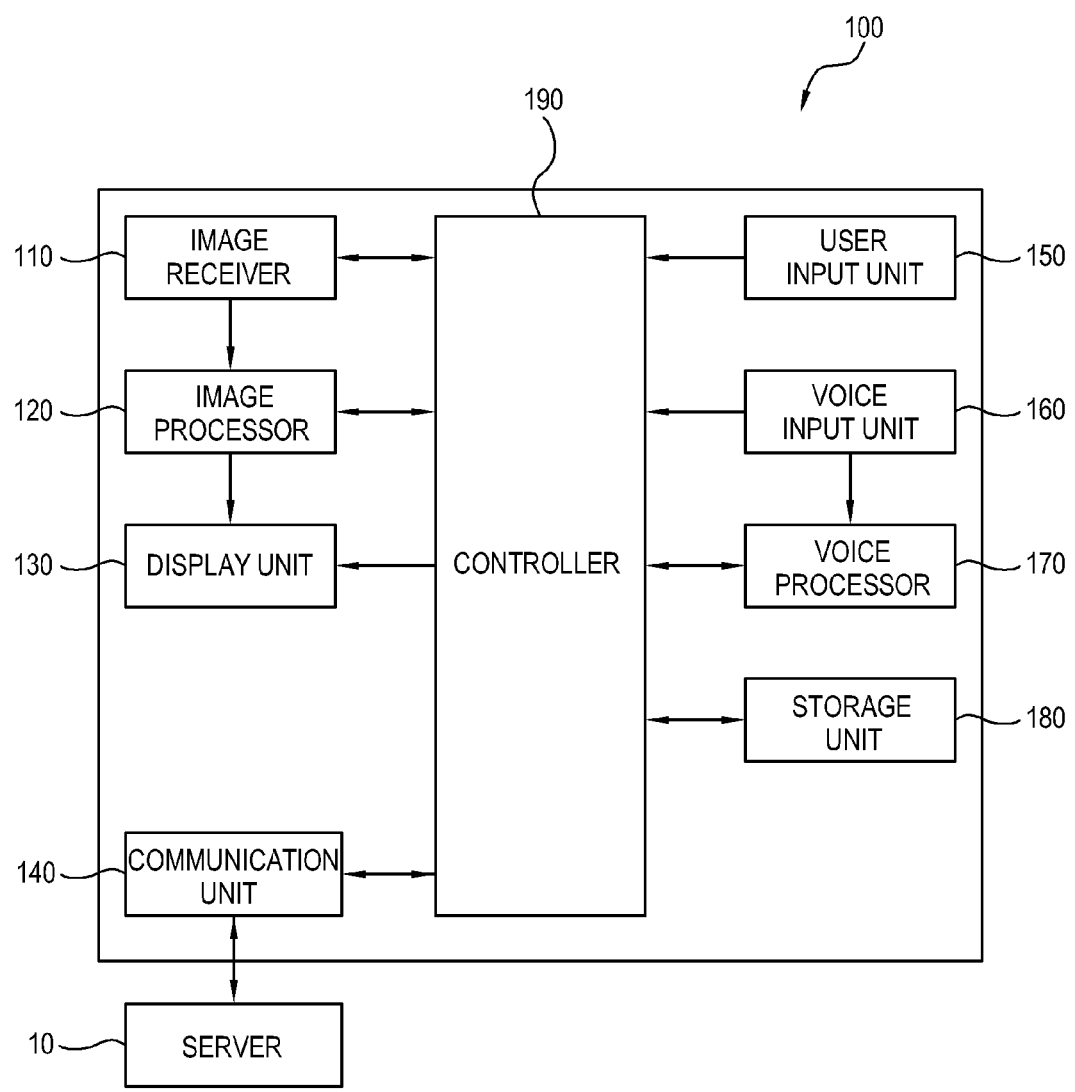
FIG. 1 is a block diagram of a display apparatus according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an image processing apparatus 100 according to a first exemplary embodiment.

Below exemplary embodiments explain the image processing apparatus 100 which may display an image on its own, but the concept of the present invention may apply to other devices which do not display an image on their own, and instead output image signals and/or control signals to another display apparatus. Thus, the concept of the present invention is not limited to the below exemplary embodiments. Although the present exemplary embodiment explains the image processing apparatus 100 which is implemented as a TV, other exemplary embodiments would have different implementations.

As shown in FIG. 1, the image processing apparatus 100 or the display apparatus 100 according to the present exemplary embodiment receives an image signal from an image supply source. The image signal which may be received by the display apparatus 100 is not limited in type nature, or format, e.g., the display apparatus 100 may receive a broadcasting signal transmitted by a transmission apparatus of a broadcasting station, tune the broadcasting signal and display a broadcasting image.

The display apparatus 100 includes an image receiver 110 which receives an image signal from an image supply source, an image processor 120 which processes an image signal received by the image receiver 110, according to a preset image processing operation, a display 130 which displays an image thereon based on the image signal processed by the image processor 120, a communication unit 140 (e.g., a communicator) which communicates with an external device such as a server 10, a user input unit 150 which is manipulated by a user, a voice input unit 160 (e.g., a voice receiver, a microphone, etc.) which receive a voice or sound from the outside, a voice processor 170 which interprets and processes the voice or sound input into the voice input unit 160, a storage unit 180 (e.g., storage) which stores data and/or information therein, and a controller 190 which controls overall operations of the display apparatus 100.

The image receiver 110 receives image signals and/or image data in a wired or wireless manner, and transmits the image signals and/or image data to the image processor 120. The image receiver 110 may vary depending on a standard of a received image signal and an exemplary embodiment type of the display apparatus 100. For example, the image receiver 110 may receive a radio frequency (RF) signal or an image signal according to various standards such as composite video, component video, super video, SCART, high definition multimedia interface (HDMI), DisplayPort, unified display interface (UDI), wireless HD standard, or other standards. If the image signal is a broadcasting signal, the image receiver 110 includes a tuner to tune into the broadcasting signal for a channel.

The image processor 120 processes the image signal received by the image receiver 110, according to various image processing operations. The image processor 120 outputs the processed image signal to the display 130, on which an image based on the processed image signal is displayed. For example, if a tuner tunes into the broadcasting signal for a particular channel in the image receiver 110, the image processor 120 extracts image, voice, and additional data from the broadcasting signal corresponding to the channel, adjusts the image signal to a preset resolution and displays an image on the display 130.

The image processing operation of the image processor 120 may include, but not limited to, a decoding operation corresponding to an image format of image data, a de-interlacing operation for converting interlace image data into progressive image data, a scaling operation for adjusting image data into a preset resolution, a noise reduction operation for improving an image quality, a detail enhancement operation, a frame refresh rate conversion, etc.

The image processor 120 is implemented as a system-on-chip (SOC) which integrates some or all of the foregoing functions, or as an image processing board which is formed by mounting individual elements on a printed circuit board (PCB) to perform some or all of the foregoing image processing operations and is installed in the display apparatus 100.

The display 130 displays an image thereon based on an image signal output by the image processor 120. The display 130 may be implemented as various display panels including liquid crystal, plasma, projection, light-emitting diode (LED), organic light-emitting diode (OLED), surface-conduction electron-emitter, carbon nano-tube, and nano-crystal, but is not limited thereto.

The display 130 may further include additional elements depending on its implementation. For example, the display 130 as an LCD may include an LCD panel, a backlight unit to emit light to the LCD panel, and a panel driving substrate to drive the LCD panel.

The communication unit 140 transmits and receives data for communication between the display apparatus 100 and the server 10. In an exemplary embodiment, the communication may be interactive communication. The communication unit 140 is connected to the server 10 through wired and/or wireless wide and/or local area network or local connection by a communication protocol of the server 10.

The user input unit 150 transmits preset various control commands or information to the controller 190 according to the received user input. The user input unit 150 is implemented as a menu key or an input panel installed in an external part of the display apparatus 100, or a remote controller which is separate from the display apparatus 100. The user input unit 150 may otherwise be integrally formed in the display 130. If the display 130 is a touch screen, a user may touch the input menu displayed on the display 130 for the transmission of a preset command to the controller 190.

The voice input unit 160 is implemented as a microphone, and detects various sounds generated from the external environment of the display apparatus 100. The sound which is detected by the voice input unit 160 includes a user's speech and other sounds which are generated by various sources other than the user.

The voice processor 170 processes voices our sounds input to the voice input unit 160, out of the various preset processes performed by the display apparatus 100. The "voice" which is processed by the voice processor 170 means a voice input to the voice input unit 160. The image signal which is processed by the image processor 120 may include voice data, which are processed by the image processor 120.

If voice or sound is input to the voice input unit 160, the voice processor 170 determines whether the input voice or sound was resulted from a user's speech or generated by other factors. Such determination may use various configurations, and cannot be specified, e.g., includes a method of determining whether the input voice or sound falls under a wavelength or frequency band corresponding to a human voice, or a method of determining whether the input voice or sound falls under or matches a user's voice profile that is stored in advance.

If it is determined that a user's speech has been input, the voice processor 170 performs a preset corresponding operation for the voice command corresponding to the speech. In an exemplary embodiment, the voice command is the content spoken by a user. This will be described in detail later.

The storage unit 180 stores data therein by a control of the controller 190. The storage unit 180 is implemented as a non-volatile memory such as a flash memory or a hard disc drive. The storage unit 180 is accessed by the controller 190, the image processor 120 or the voice processor 170, and data stored therein may be read, written, modified, deleted, or updated by the controller 190, the image processor 120 or the voice processor 170.

Upon receiving a user's speech through the voice input unit 160, the controller 190 controls the voice processor 170 to process the input speech. When the image processor 120 processes the image signal received by the image receiver 110 to display a broadcasting image on the display 130, the controller 190 changes a channel according to the content of a user's speech if the user's speech is received to command the change of the channel through the voice input unit 160.

The voice command relating to the 'change of channel' may include speaking a channel number of a broadcasting channel desired by a user or speaking a call sign of a desired broadcasting channel. The channel number and call sign are expressions which are set in advance to distinguish the channels from each other. The channel number is expressed in a positive number such as 6, 7 and 11.

The call sign is an ID of a provider which provides a particular channel, and is generally an identification name of a broadcasting station which broadcasts the channel. There may be a plurality of call signs for a single channel, and if a single broadcasting station provides a plurality of channels, the respective channels have different call signs to distinguish themselves. Alternative forms ID are in numeric, alphabetic, or alphanumeric forms.

The example of the former case is as follows: if a call sign of a predetermined first channel is "KBS", then such a call sign "Korean Broadcasting System" may refer to the first channel identically to "KBS". A call sign of a predetermined second channel in one geographical location is "MBC" but the call sign of the second channel in another geographical location may be "TNN". That is, there may be a plurality of call signs for a particular channel.

The example of the latter case is as follows: a broadcasting station having a call sign "KBS" may provide a broadcasting signal to a predetermined third channel and fourth cannel. In this case, a call sign of the third channel is "KBS-1", and a call sign of the fourth channel is "KBS-2", which are different from each other. "KBS" may be considered as a representative call sign of the broadcasting station, and "KBS-1" and "KBS-2" are subordinate call signs to "KBS". That is, the call sign "KBS" relates to both the third channel and the fourth channel.

Accordingly, if the user's speech which is input through the voice input unit 160 is a voice command "play KBS", it may be unclear which of the third channel of "KBS-1" and the fourth channel of "KBS-2" is being referred to.

According to the present exemplary embodiment, the controller 190 determines whether the voice command corresponding to the user's speech includes a keyword relating to the call sign of the broadcasting channel.

If it is determined that the voice command includes the keyword relating to the call sign, the controller 190 controls the voice processor 170 to search a call sign corresponding to the keyword from a database including a plurality of call signs. The database is stored in the storage unit 180, and the searched call sign is called a call sign candidate. If a plurality of call sign candidates corresponding to the keyword has been searched, the controller 190 selects a call sign as a recommended call sign from the plurality of call sign candidates under preset selection conditions. In other exemplary embodiments, the call sign selected by the controller may be a best match call sign, an estimated call sign, or a recognized call sign.

Otherwise, the controller 190 may transmit the keyword and voice command to the server 10 storing the database. Then, the sever 10, according to the principle which is similar to that explained above, selects the recommended call sign, analyzes a corresponding operation in the voice command and transmits a control signal to the display apparatus 100 according to the selection and the analysis results.

The controller 190 performs a corresponding operation with respect to the broadcasting signal of the selected, recommended call sign, for the voice command.

Hereinafter, a configuration of the database 200 and a method of searching a call sign candidate 230 from a database 200 will be described with reference to FIG. 2.

Figure 2:
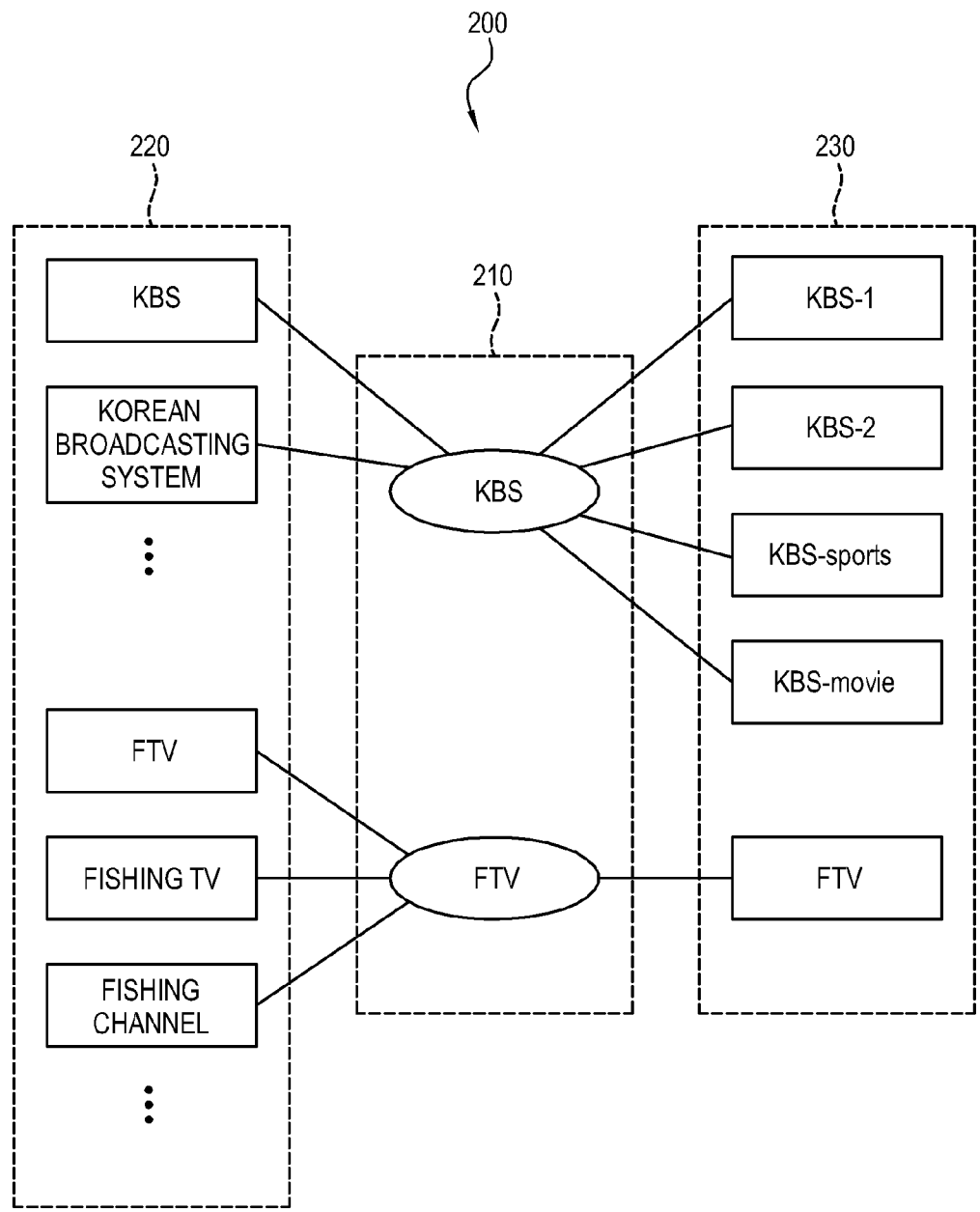
FIG. 2 illustrates an example of a structure of a database relating to keyword and call sign candidates.

FIG. 2 illustrates an example of the database 200.

As shown therein, the controller 190 determines whether the voice command "play KBS" changed to a text from a user's speech includes a keyword relating to a call sign. If the storage unit 180 stores therein relationship database 200 which maps the keyword and call sign, the controller 190 may search a predetermined keyword from the database 200 and determine whether the keyword relates to the call sign.

The database 200 maps a plurality of keywords 220 and a plurality of call signs 230, and is used to search for at least one call sign candidate among the plurality of call signs 230 based on a single keyword of the plurality of keywords 220. The drawing illustrates only the relationship of items relating to two representative call signs, "KBS" and "FTV", from the database 200.

The representative call signs 210 act as a link between the plurality of keywords 220 and the plurality of call signs 230. More specifically, if a predetermined keyword of the plurality of keywords 220 is input, a representative call sign corresponding to the predetermined keyword is searched for in the database 200. If the corresponding representative call sign 210 is found, a subordinate call sign or a relevant call sign candidate corresponding to the searched for representative call sign 210 is secondarily searched for.

In the case of a keyword, various terms including synonyms relating to the representative call sign are grouped and/or categorized for the representative call sign. The call sign candidates include call signs of at least one channel relating to the representative call sign 210, and the call signs are grouped and/or categorized for the representative call sign 210.

For example, if a keyword "fishing channel" is input, the representative call sign relating to "fishing channel" is "FTV", and the call sign candidate relating to the representative call sign "FTV" 20 is only one, "FTV". That is, according to the search results from the database 200, the call sign of the channel corresponding to the keyword "fishing channel" 220 is "FTV" alone.

If the keyword "KBS" is input, the representative call sign relating to "KBS" is "KBS", and the call sign candidates relating to the representative call sign "KBS" are four candidates, i.e., "KBS-1", "KBS-2", "KBS-sports" and "KBS-movie".

The database 200 is searched by the foregoing method to obtain at least one call sign candidate relating to the keyword. The foregoing method is only an example for implementing the database 200, and the implementation method of the database 200 may vary and is not limited to the foregoing example.

Figure 3:
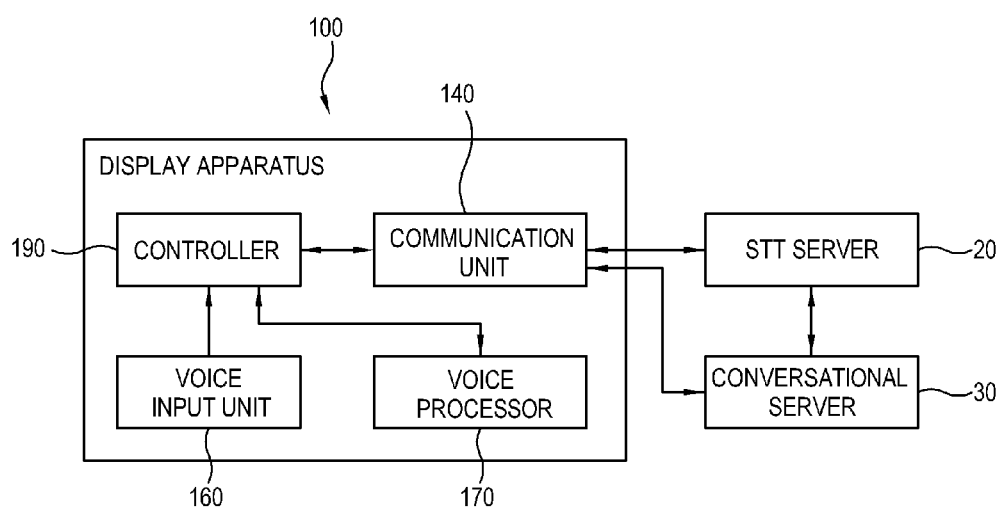
FIG. 3 is a block diagram of an interaction structure of the display apparatus and a server in FIG. 1.

FIG. 3 is a block diagram showing an interaction structure of the display apparatus 100 and the servers 20 and 30.

As shown therein, the display apparatus 100 includes a communication unit 140, a voice input unit 160, a voice processor 170 and a controller 190. The elements are the same as those explained in FIG. 1. The communication unit 140 is connected to a speech-to-text (STT) server 20 which converts a user's speech into a voice command, and to a conversational server 30 which analyzes a voice command to determine an operation corresponding to the voice command.

The STT server 20 analyzes a waveform of a received voice signal and generates a text from the content of the voice signal. The STT server 20 converts a voice signal of a user's speech transmitted by the display apparatus 200, into a voice command.

The conversational server 30 includes a database which maps various operations of the display apparatus 100 corresponding to a voice command. The conversational server 30 analyzes the voice command transmitted by the display apparatus 100, and transmits to the display apparatus 100 a control signal to perform an operation corresponding to the voice command according to the analysis results.

If a user's speech is input to or received at the voice input unit 160, the controller 190 transmits a voice signal of the speech to the STT server 20, and receives a voice command from the STT server 20 corresponding to the speech.

The controller 190 determines whether the voice command transmitted by the STT server 20 is a short sentence or a conversational sentence. If the voice command is a short sentence, the controller 190 controls the voice processor 170 to process the voice command. If the voice command is a conversational sentence, the controller 190 controls the conversational server 30 to process the voice command. In an exemplary embodiment, the short sentence may be distinguished from a conversational sentence based on the number of words or a number of phonemes. In one exemplary embodiment, the short sentence has N or less words, where N1 may be one of 1, 2, 3, 4, 5, 6, 7, 8, and a conversational sentence has more than N words. In another exemplary embodiment, the short sentence has N2 or less phonemes, where N2 may be one of 1, 2, 3, 4, 5, 6, 7, 8 and a conversational sentence has more than N phonemes.

This is because the conversational sentence is natural language, and mechanical extraction of a desired corresponding operation from the voice command as the conversational sentence is not relatively easy. For example, if a user's voice command is a short sentence "play KBS", the voice processor 170 may immediately perform the operation with the call sign keyword "KBS" and an operation keyword "play".

However, if the voice command is a conversational sentence "change the current channel to Korean Broadcasting System" which has substantially the same content as the foregoing short sentence, the process of extracting the call sign keyword "KBS" corresponding to "Korean Broadcasting System", and the process of extracting the operation keyword "play" corresponding to "change to" are required. Due to various factors such as system load or quantity of the database, processing of such a conversational sentence by the voice processor 170 may not be easy.

Figure 4:
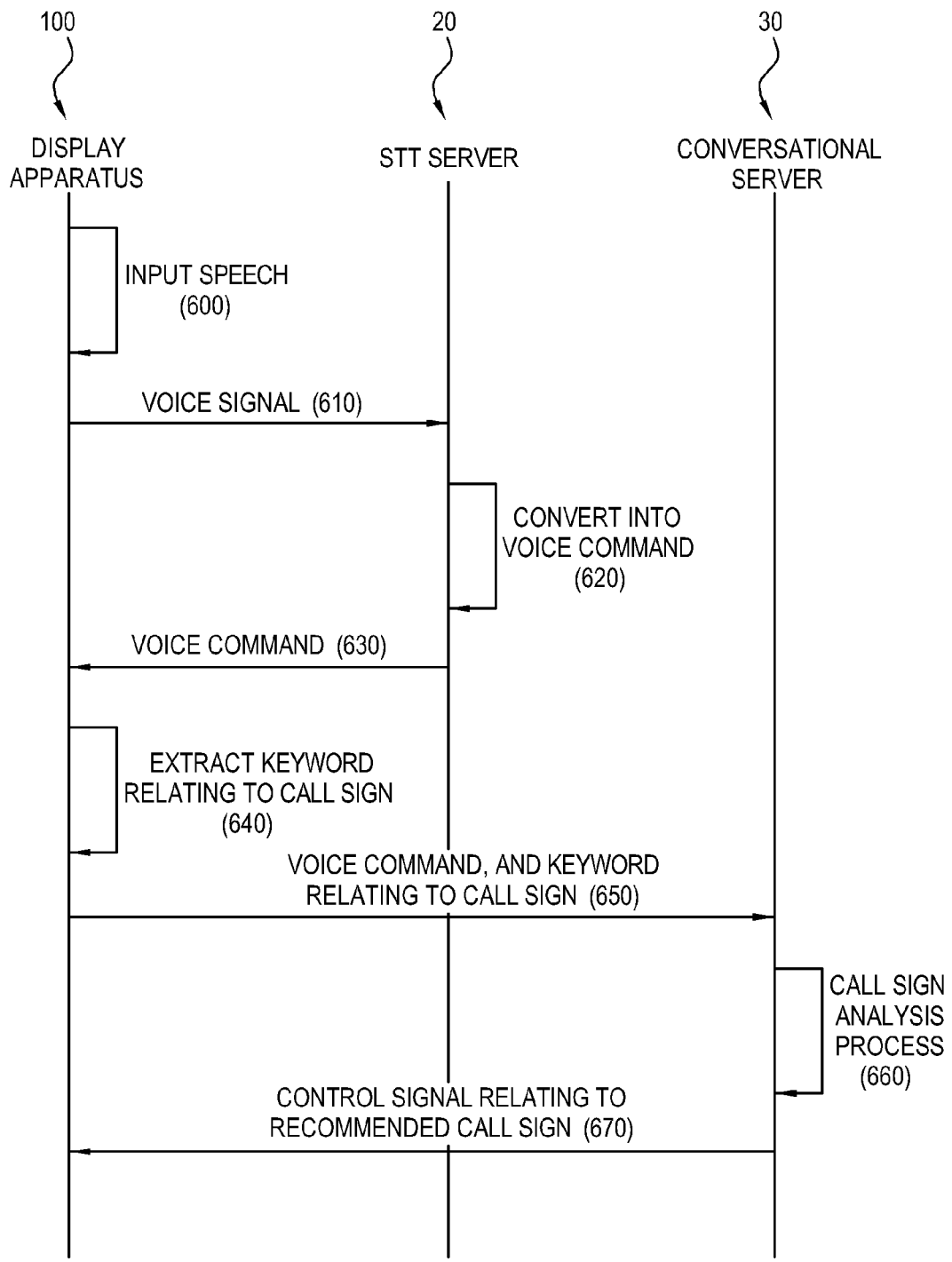
FIG. 4 illustrates an example of an interaction process between the display apparatus and server in FIG. 3.

FIG. 4 illustrates an example of an interaction process among the display apparatus 100 and the servers 20 and 30 according to the present exemplary embodiment.

As shown therein, upon receiving an input of a user's speech (600), the display apparatus 100 transmits the voice signal of the speech to the STT server 20 (610).

The STT server 20 converts the voice signal into a voice command (620), and transmits the converted voice command to the display apparatus 100 (630).

The display apparatus 100 analyzes the voice command transmitted by the STT server 30, and extracts the keyword relating to the call sign from the voice command (640). The display apparatus 100 determines whether the voice command is a short sentence or a conversational sentence.

If it is determined that the voice command is a conversational sentence, the display apparatus 100 transmits the voice command and the keyword relating to the call sign to the conversational server 30 (650).

The conversational server 30 performs a call sign analysis process in view of the voice command and the keyword relating to the call sign transmitted by the display apparatus 100 (660). The call sign analysis process includes a process of searching for a call sign candidate corresponding to the keyword relating to the call sign, a process of selecting a call sign from the searched call sign candidates as a recommended call sign, and a process of determining the operation of the display apparatus 100 corresponding to the recommended call sign within the text. This will be described in more detail later.

If the selection of the recommended call sign and determination of the corresponding operation of the voice command is completed, the conversational server 30 transmits a control signal to the display apparatus 100 according to such selection and determination results. The display apparatus 100 may perform the corresponding operation with respect to the recommended call sign according to the control signal.

For example, if it is analyzed that the recommended call sign is "KBS-1" and the corresponding operation is change of channel, the conversational server 30 transmits the control signal instructing such content, to the display apparatus 100, which changes the channel to "KBS-1".

If it is determined that the voice command is a short sentence at operation 640, the display apparatus 100 performs the call sign analysis process in respect of the received voice command and the keyword relating to the call sign. Such process is performed according to substantially the same principle as the process performed by the conversational server 30.

Hereinafter, the call sign analysis process in respect of the keyword relating to the call sign will be described.

The conversational server 30 searches for the call sign candidate corresponding to the keyword relating to the call sign, and determines whether there are a plurality of call sign candidates.

Determining whether the voice command includes the keyword relating to the call sign and searching for the call sign candidate corresponding to the keyword may be performed by the same method as that explained in FIG. 2. That is, the conversational server 30 searches for the words extracted from the voice command, from the database 200 (refer to FIG. 200) and determines whether there is any matching word 220 (refer to FIG. 2), and if so, may obtain the call sign candidate (refer to FIG. 2) of the representative call sign (refer to FIG. 2).

In the process of extracting the keyword from the voice command, correction or filtering of an error in the voice command may be performed. For example, if there is a voice command "play Orean Broadcasting System", the word "Korean Broadcasting System" in the database may be selected even if the word "Orean Broadcasting System" is not included in the database but "Korean Broadcasting System" is determined to be similar to the word "Orean Broadcasting System". The method of determining similarities of words may vary, and does not limit the concept of the present invention.

If there is only one call sign candidate, the conversational server 30 selects the call sign candidate as a recommended call sign.

If there are a plurality of call sign candidates, the conversational server 30 selects a recommended call sign under preset selection conditions.

The selection conditions for selecting the recommended call sign from the call sign candidates may be set in advance. For example, the conversational server 30 may select a plurality of call signs whose historical selection frequencies are of a preset rank or higher, as the recommended call signs, or select a single call sign whose historical selection frequency is the highest, as the recommended call sign.

If there are four call signs "KBS-1", "KBS-2", "KBS-sports", and "KBS-movie" as the call sign candidates, the controller 190 determines the historical selection frequency of the channels in the display apparatus 100 for a predetermined period based on usage history information. For example, if the call signs are ordered according to decreasing historical selection frequency, then the order could be "KBS-sports", "KBS-movie", "KBS-2", and "KBS-1", the controller 190 may select a plurality of call signs in the order of the historical selection frequency or select a single call sign.

The controller 190 may display a user interface (UI) which is used for a user to select one of the plurality of call sign candidates.

Figure 5:
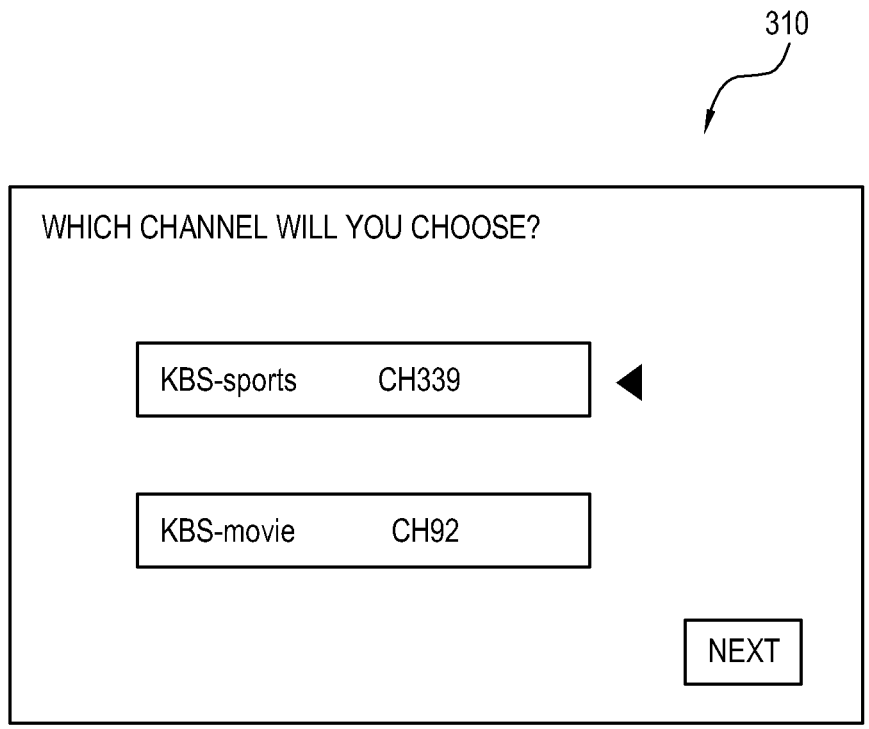
FIGS. 5 and 6 illustrate an example of a user interface (UI) image which is provided to select one of a plurality of recommended call signs in the display apparatus in FIG. 1.
Figure 6:
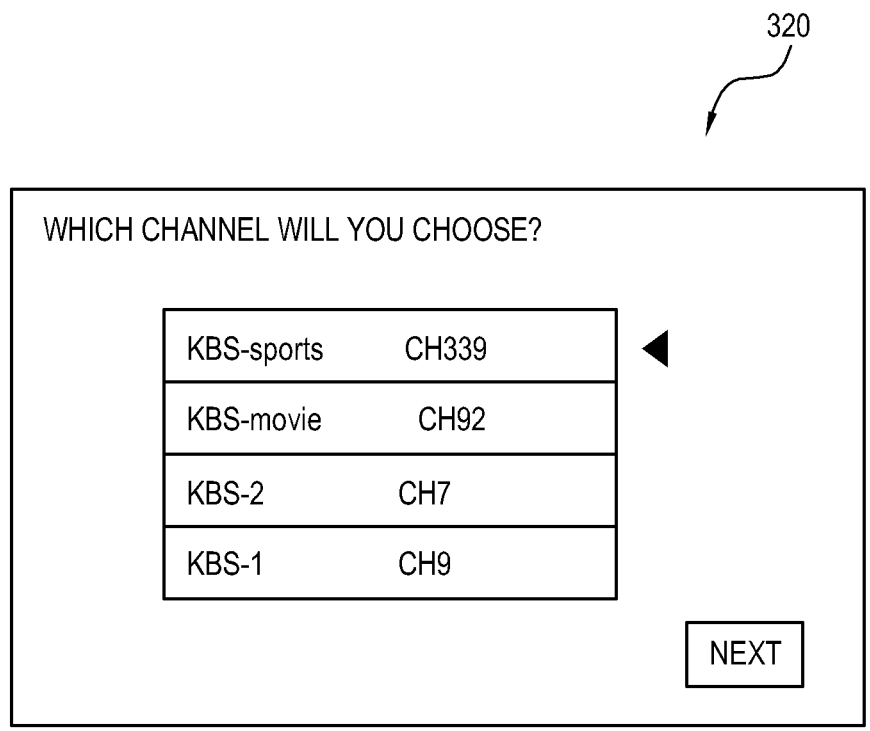

FIGS. 5 and 6 illustrate an example of UIs 310 and 320 which are provided to select one of a plurality of recommended call signs.

As shown in FIG. 5, the controller 190 selects "KBS-sports" and "KBS-movie", which have been selected most frequently from the display apparatus 100, as the recommended call sign based on usage history information, and provides the UI 310 for a user to select a desired channel from the selected recommended call sign. A user may select one call sign and broadcasting channel from "KBS-sports" and "KBS-movie" through the UI 310.

As shown in FIG. 6, the controller 190 may provide the UI 320 which is used to select one of all call sign candidates "KBS-sports", "KBS-movie", "KBS-2", and "KBS-1". The controller 190 may display all of the searched for call sign candidates in the UI 320, but may determine the display order of the call signs according to the historical selection frequency. For example, the UI 320 may display the call sign candidates in the order starting from the highest historical selection frequency.

If a user's selection is not made for preset time while the UIs 310 and 320 are displayed, the controller 190 may select the top ranked channel, e.g., "KBS-sports" which is has been selected mostly frequently, from the call sign candidates.

The selection conditions for selecting the recommended call sign from the call sign candidates may be different from the foregoing example. The server 10 (refer to FIG. 1) is connected to various other display apparatuses other than the display apparatus 100. The server 10 may be identical to or different from the STT server 20 or the conversational server 30. The STT server 20 and the conversational server 30 have been descried as different, but may be implemented as identical servers.

The other display apparatuses transmit usage history information to the server 10. The server 10 determines the selection frequency of "KBS-1", "KBS-2", "KBS-sports", ad "KBS-movie" within the call sign candidates based on the usage history information collected from the other display apparatuses.

The controller 190 transmits the call sign candidates "KBS-1", "KBS-2", "KBS-sports", and "KBS-movie" to the server 10, and may request the server 10 to select the recommended candidate from the call sign candidates.

The server 10 determines the selection ranking based on the usage history information from the other display apparatuses, within the call sign candidates. If the selection ranking is shown in the order of "KBS-movie", "KBS-2", "KBS-sports", and "KBS-1" and the number of the recommended candidate requested by the display apparatus 100 is one, the server 10 decides "KBS-movie" which has been selected most frequently, as a recommended candidate, and notifies the display apparatus 100 of the foregoing. The controller 190 may display information relating to "KBS-movie", as an image.

If only one recommended call sign is selected, the controller 190 may automatically display an image of a broadcasting channel of the recommended call sign. However, the channel number corresponding to the call sign may not be identical according to geographical location.

Accordingly, the controller 190 obtains geographical location information regarding the geographical location where the display apparatus 100 is located, and determines a channel number of the call sign for the geographical location. The method of determining the geographical location of the display apparatus 100 may vary, e.g., extracting geographical location and/or country ID included in a header or metadata of a broadcasting signal, determining by the server 10 based on a mac address of the communication unit 140 or inputting geographical location information by a user in advance, in the display apparatus 100.

As described above, if the voice command corresponding to the user's speech includes a keyword relating to the call sign, the display apparatus 100 selects the recommended call sign corresponding to the keyword, and performs a corresponding operation according to the voice command in respect of the broadcasting channel of the selected recommended call sign.

Figure 7:
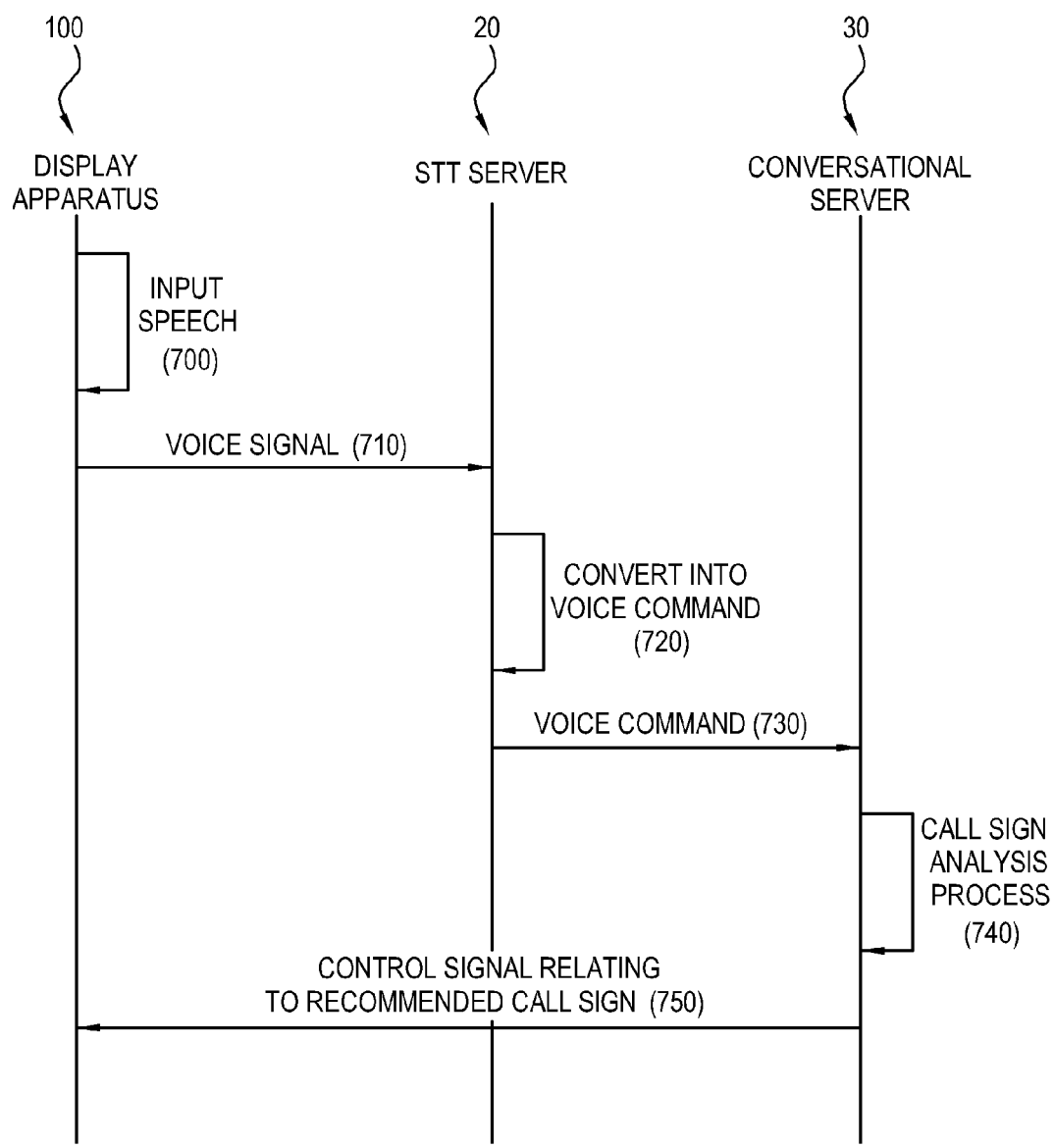
FIG. 7 illustrates an example of an interaction process between a display apparatus and a server according to a second exemplary embodiment.

FIG. 7 illustrates an example of an interaction process of a display apparatus 100 and servers 20 and 30 according to a second exemplary embodiment.

As shown therein, upon receiving an input of a user's speech (700), the display apparatus 100 transmits the voice signal of the speech to the STT server 20 (710).

The STT server 20 converts the received voice signal into a voice command (720). The operations 700 to 720 are the same as those in FIG. 4.

The STT server 20 transmits the voice command to the conversational server 30 (730).

The conversational server 30 performs the call sign analysis process such as searching call sign candidates, and selecting the recommended call sign (740). The detailed description may be similar to those of the foregoing exemplary embodiment, and will not be provided again. However, the call sign analysis process according to the present exemplary embodiment is performed by extracting a call sign word from a voice command by the conversational server 30 unlike the case in FIG. 4.

The conversational server 30 transmits the recommended call sign and a control signal instructing a corresponding operation to the display apparatus 100, which operates according to the control signal (750).

In the foregoing exemplary embodiment, the configuration for converting the user's speech input to the display apparatus 100 into the voice command by the STT server 20 and processing the short sentence as the voice command, by the display apparatus 100 and processing the conversational sentence as the voice command, by the conversational server 30 have been explained.

However, the concept of the present invention is not limited to the foregoing, and the configuration for converting the speech into the voice command and the configuration regarding the subject which processes the voice command depending on whether the voice command is short sentence or conversational sentence may be different from the foregoing exemplary embodiment.

Figure 8:
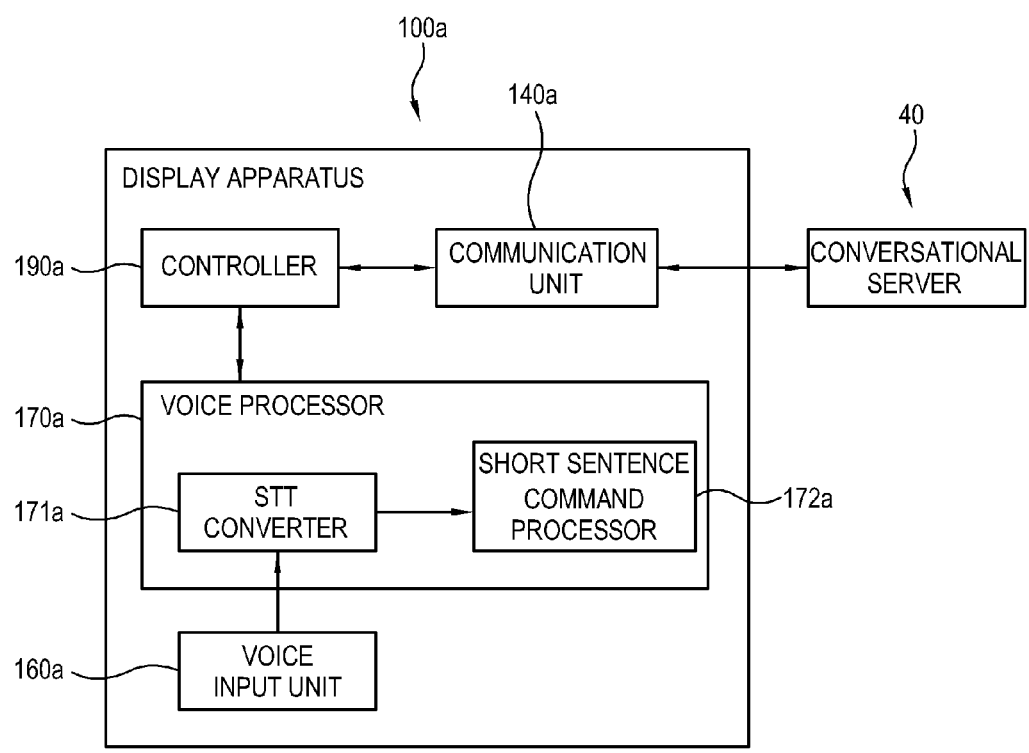
FIG. 8 is a block diagram of an interaction structure of a display apparatus and a server according to a third exemplary embodiment.
Figure 9:
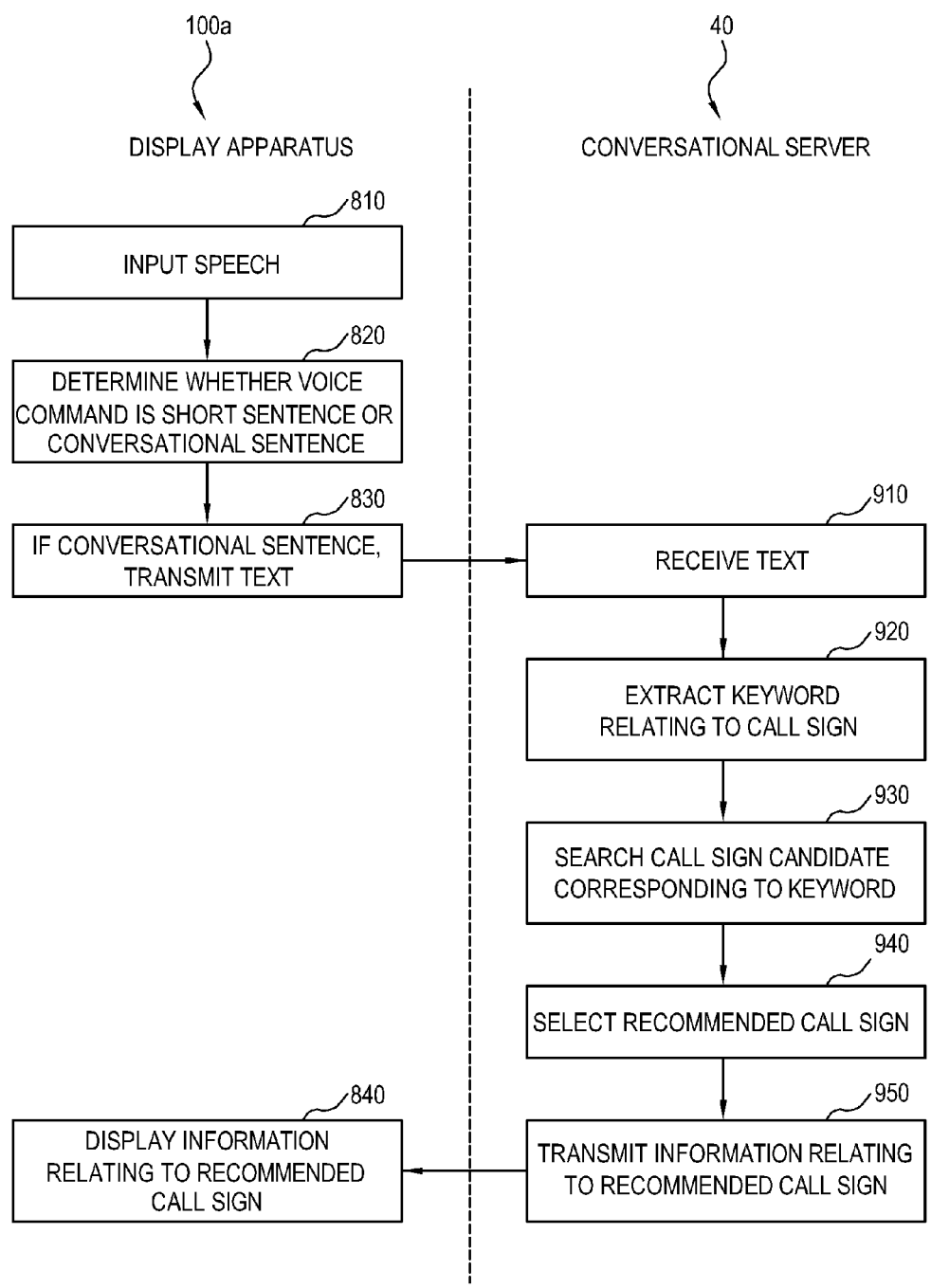
FIG. 9 illustrates an interaction process between the display apparatus and the server in FIG. 8.

FIG. 8 is a block diagram showing an interaction structure of a display apparatus 100a and a server 40 according to a third exemplary embodiment. FIG. 9 illustrates an example of an interaction process between the display apparatus 100a and the server 40 in FIG. 8.

As shown in FIG. 8, the display apparatus 100a includes a communication unit 140a, a voice input unit 160a, a voice processor 170a and a controller 190a.

The voice processor 170a includes an STT converter 171a which converts a speech transmitted by the voice input unit 160a, into a voice command, and a short sentence command processor 172a which processes the voice command if the voice command is a short sentence.

If a user's speech is input, the voice input unit 160a transmits a voice signal of the input speech to the STT converter 171a. The STT converter 171a analyzes the voice signal transmitted by the voice input unit 160a, and converts the voice signal into a voice command including the content of the voice. The STT converter 17a transmits the converted voice command to the controller 190a. That is, the STT converter 171a performs a function of the STT server 20 in the first exemplary embodiment.

The controller 190a determines whether the voice command is a short sentence or a conversational sentence. If the voice command is a short sentence, the controller 190a transmits the voice command to the short sentence command processor 172a. The short sentence command processor 172a analyzes the voice command by a control of the controller 190a, and performs a corresponding operation according to the analysis results. The analysis and execution of the voice command may employ the foregoing exemplary embodiment and detailed description will be omitted.

If the voice command is a conversational sentence, the controller 190a transmits the voice command to the conversational server 40 through the communication unit 140a rather than to the short sentence command processor 172a. The conversational server 20 performs the same function as the conversational server 30 according to the first exemplary embodiment.

The display apparatus 100a performs an operation corresponding to a control signal transmitted by the conversational server 20.

As shown in FIG. 9, the display apparatus 100a is connected to the conversational server 40 for communication. If a user's speech is input (810), the display apparatus 100a determines whether a voice command corresponding to the speech is a short sentence or a conversational sentence (820). If it is determined that the voice command is a conversational sentence, the display apparatus 100a transmits the voice command to the conversational server 40 (830).

Upon receiving a voice command from the display apparatus 100 (910), the conversational server 40 extracts the keyword relating to the call sign, from the voice command (920).

Otherwise, the keyword relating to the call sign may be extracted by the display apparatus 100a rather than by the conversational server 40. In this case, the display apparatus 100a transmits the keyword relating to the call sign together with the voice command, to the conversational server 40.

The conversational server 40 searches the call sign candidate corresponding to the keyword (930). If a plurality of call sign candidates are found, the conversational server 40 selects a call sign from the plurality of searched call sign candidates as a recommend call sign, under the selection conditions as described above (940). The conversational serve 40 analyzes the voice command and determines a corresponding operation under the voice command.

The conversational server 40 transmits the recommended call sign and a control signal instructing the corresponding operation, to the display apparatus 100a (950).

The display apparatus 100a performs the corresponding operation with respect to the broadcasting signal of the recommended call sign, according to the control signal transmitted by the conversational server 40 (840).

If it is determined that the voice command is a short sentence at operation 820, the display apparatus 100 analyzes the recommended call sign and corresponding operation.

Figure 10:
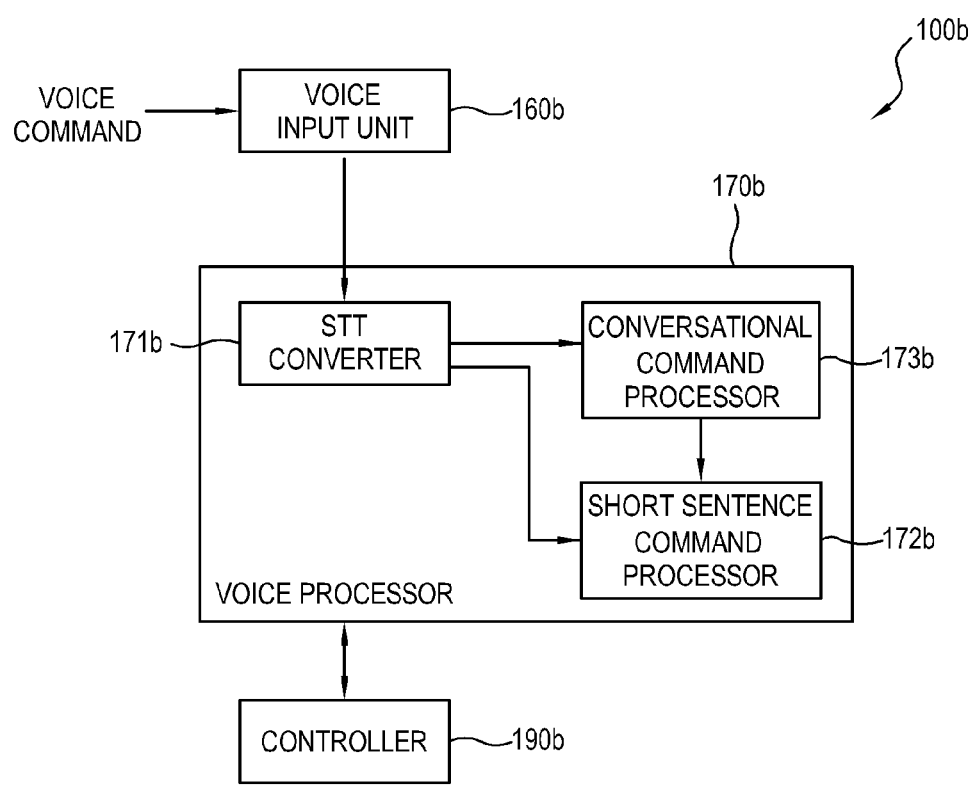
FIG. 10 is a block diagram showing a signal transmission structure of a voice processor of a display apparatus according to a fourth exemplary embodiment.

FIG. 10 is a block diagram showing a signal transmission structure of a voice processor 171b of a display apparatus 100b according to a fourth exemplary embodiment.

As shown therein, the voice processor 170b includes an STT converter 171b which converts a user's speech transmitted by the voice input unit 160b, into a voice command, a short sentence command processor 172b which processes a voice command if the voice command converted by the STT converter 171b is a short sentence, and a conversational command processor 173b which processes a voice command converted by the STT converter 171b if the voice command is a conversational sentence/natural language. The structure of the voice processor 170b is not limited to the foregoing example, and the present example briefly explains the matters directly relating to the present exemplary embodiment.

If a user's speech is input, the voice input unit 160b transmits a voice signal of the input speech to the STT converter 171b. The STT converter 171b converts the speech transmitted by the voice input unit 160b, into a voice command including the content of the speech. The STT converter 171b transmits the converted voice command to the controller 190b.

The controller 190b determines whether the voice command is a short sentence or a conversational sentence. The foregoing determination may be made by various algorithms.

If the voice command is a short sentence, the controller 190b transmits the voice command to the short sentence command processor 172b. If the voice command is a conversational sentence, the controller 190b transmits the voice command to the conversational command processor 173b.

The short sentence command processor 172b performs substantially the same function as the short sentence command processor 172b in FIG. 8. The conversational command processor 173b performs the function performed by the conversational servers 30 and 40 according to the foregoing embodiments.

That is, unlike the foregoing exemplary embodiments, the display apparatus 100b according to the present exemplary embodiment may convert the voice command from the user's speech and analyze the operation corresponding to the voice command rather than exchanging data and/or signals with the external servers 20 to 40.

If the display apparatus is connected to an additional server which performs the call sign analysis process, the short sentence command processor 172a or the conversational command processor 173b may transmit the keyword and the voice command to the server, which performs the call sign analysis process.

That is, in the foregoing exemplary embodiments, the conversational servers 30 and 40 or the voice processors 170, 170a and 170b perform the call sign analysis process, but the call sign analysis process may otherwise be performed by an additional server.

Although a few exemplary embodiments have been shown and described, it will be appreciated by those skilled in the art that changes may be made in these exemplary embodiments without departing from the principles and spirit of the invention, the range of which is defined in the appended claims and their equivalents. Furthermore, it will be appreciated by those skilled in the art that all of the units mentioned above may be implemented in hardware.

What is claimed is:

1. An image processing apparatus comprising:
   an image processor which processes a broadcasting signal received from an outside, to display an image based on the processed broadcasting signal;
   a communicator which is operable to communicate with a server;
   a voice receiver which receives a user's speech;
   a voice processor which is operable to process a performance of an operation according to a voice command corresponding to the user's speech; and
   a controller which processes the voice command corresponding to the user's speech through one of the voice processor and the server if the speech is received through the voice receiver,
   wherein if the voice command comprises a keyword relating to a desired call sign of a broadcasting channel, the controller controls one of the voice processor and the server to search a plurality of call signs corresponding to the keyword according to a predetermined selection condition, as recommended call signs, controls to display an user interface (UI) image being provided to select one of the searched call signs, and performs the operation according to the voice command with respect to the broadcasting channel of the selected call sign through the UI image.

2. The image processing apparatus according to claim 1, wherein a database including a plurality of call sign candidates corresponding to keywords is stored in one of the image processing apparatus and the server, and the recommended call sign is searched from the plurality of call sign candidates in the database, under the predetermined selection condition.

3. The image processing apparatus according to claim 2, wherein the predetermined selection condition comprises selection of call sign candidates, as the recommended call signs, based on a selection frequency of the call sign candidate that is equal or greater than a preset rank, among the plurality of call sign candidates.

4. The image processing apparatus according to claim 2, wherein the predetermined selection condition comprises selection of the call sign candidates, as the recommended call signs, based on a selection frequency of the call sign candidate that is equal or greater than a preset rank, the selection frequency being from a plurality of other image processing apparatuses communicating with the server, among the plurality of call sign candidates.

5. The image processing apparatus according to claim 1, wherein if one of the recommended call signs is not selected for a preset time after the UI image is displayed, the controller selects one of the recommended call signs under the predetermined selection condition.

6. The image processing apparatus according to claim 1, wherein the communication unit communicates with a speech-to-text (STT) server which converts the user's speech into a voice command of a text, and upon input of the user's speech to the voice receiver, the controller transmits a voice signal of the user's speech to the STT server, and receives the voice command corresponding to the user's speech from the STT server.

7. The image processing apparatus according to claim 6, wherein the controller controls the voice command to be processed by the voice processor if it is determined that the voice command is a short sentence, and controls the voice command to be processed by the server if the voice command is a conversational sentence.

8. The image processing apparatus according to claim 1, further comprising a display configured to displays an image thereon based on a broadcasting signal processed by the image processor.

9. A control method of an image processing apparatus which communicates with a server, the method comprising:
receiving a user's speech; and
processing a voice command corresponding to the user's speech through one of the image processing apparatus and the server, and performing an operation according to the voice command,
wherein the performing the operation according to the voice command comprises:
controlling to search a plurality of call signs corresponding to a keyword, as recommended call signs, by one of the image processing apparatus and the server under a preset selection condition if the voice command comprises the keyword relating to a call sign of a broadcasting channel;
displaying an UI image being provided to select one of the searched call signs; and
performing an operation according to the voice command with respect to a broadcasting channel of the selected call sign through the UI image.

10. The control method according to claim 9, wherein a database including a plurality of call sign candidates corresponding to keywords is stored in one of the image processing apparatus and the server, and the recommended call sign is searched from the plurality of call sign candidates in the database, under the preset selection condition.

11. The control method according to claim 10, wherein the preset selection condition comprises selection of call sign candidates, as the recommended call signs, based on a selection frequency of the call sign candidate that is equal or greater than a preset rank, among the plurality of call sign candidates.

12. The control method according to claim 10, wherein the preset selection condition comprises selection of the call sign candidates, as the recommended call signs, based on a selection frequency of the call sign candidate that is equal or greater than a preset rank, the selection frequency being from a plurality of other image processing apparatuses communicating with the server, among the plurality of call sign candidates.

13. The control method according to claim 9, wherein the displaying the UI image comprises selecting one of the recommended call signs under the preset selection condition if one of the recommended call signs is not selected for a preset time after the UI is displayed.

14. The control method according to claim 9, wherein the image processing apparatus communicates with a speech-to-text (STT) server which converts the user's speech into a voice command of a text, and the receiving the user's speech comprises transmitting a voice signal of the user's speech to the STT server, and receiving the voice command corresponding to the user's speech from the STT server.

15. The control method according to claim 14, wherein the performing the preset corresponding operation under the voice command comprises processing the voice command through the image processing apparatus if the voice command is a short sentence, and processing the voice command through the server if the voice command is a conversational sentence.

16. An image processing system comprising:
an image processing apparatus which processes a broadcasting signal received from an outside, to display an image based on the processed broadcasting signal;
a server which communicates with the image processing apparatus, wherein the image processing apparatus comprises a voice receiver which is operable to receive a user's speech, a voice processor which performs a preset corresponding operation for a voice command corresponding to the user's speech; and
a controller which controls one of the voice processor and the server to process the voice command corresponding to the user's speech, if the user's speech is received,
wherein the controller controls one of the voice processor and the server to search a plurality of call signs corresponding to a keyword, as recommended call signs, under preset selection condition if the voice command comprises the keyword relating to a call sign of a broadcasting channel, controls to display an UI image being provided to select one of the searched call signs, and performs a corresponding operation under the voice command with respect to a broadcasting channel of the selected call sign through the UI image.

17. The image processing system according to claim 16, further comprising a speech-to-text (STT) server which converts the user's speech into a voice command of a text, wherein if the user's speech is input to the voice input unit, the controller transmits a voice signal of the user's speech to the STT server, and receives the voice command corresponding to the user's speech from the STT server.

18. A voice command recognition method comprising:
receiving a user voice command through a microphone of a display device, to switch from a displayed broadcast channel to another broadcast channel, the user voice command including a identifier (ID) of the other broadcast channel;
digitizing the user voice command and processing the digitized user voice command;
comparing the processed user voice command with pre-stored digital models of IDs of a plurality of broadcast channels and determining at least two of the pre-stored digital models of IDs of the plurality of broadcast channels as being matches, the comparing operation being performed at least one of the display device or an external server that is separate from the display device;
displaying an UI image being provided to select one of the determined at least two of the pre-stored digital models of IDs; and
switching from the displayed broadcast channel to a broadcast channel corresponding to the selected one of the at least two digital models of IDs through the UI image.

19. The voice command recognition method of claim 18, wherein the ID is one from among a numeric ID, alphabetic ID, and an alphanumeric ID.

20. The voice command recognition method of claim 18 further comprising:
automatically selecting one of the displayed IDs if a user input to select one of the displayed IDs is not received while the UI image is displayed, the selected one of the displayed IDs having been previously selected the most among the displayed IDs.

* * * * *